US012637234B2

(12) United States Patent　　　　(10) Patent No.:　US 12,637,234 B2
Clermont　　　　　　　　　　　　　(45) Date of Patent:　May 26, 2026

(54) AIRCRAFT GROUND SUPPORT UNIT WITH AUTONOMY EVALUATION

(71) Applicant: ATHENA PI, Chateauneuf sur Loire (FR)

(72) Inventor: Lionel Clermont, Chateauneuf sur Loire (FR)

(73) Assignee: ATHENA PI, Chateauneuf sur Loire (FR)

( * ) Notice: Subject to any disclaimer, the term of this patent is extended or adjusted under 35 U.S.C. 154(b) by 177 days.

(21) Appl. No.: 18/575,920

(22) PCT Filed: Jul. 13, 2021

(86) PCT No.: PCT/IB2021/000490
§ 371 (c)(1),
(2) Date: Jan. 2, 2024

(87) PCT Pub. No.: WO2023/285851
PCT Pub. Date: Jan. 19, 2023

(65) Prior Publication Data
US 2024/0308686 A1　　　Sep. 19, 2024

(51) Int. Cl.
*B64F 1/35*　　　　(2024.01)
*B60L 50/50*　　　(2019.01)
(Continued)

(52) U.S. Cl.
CPC .............. *B64F 1/352* (2024.01); *B60L 50/50* (2019.02); *B64F 1/00* (2013.01); *B64F 1/22* (2013.01);
(Continued)

(58) Field of Classification Search
CPC .... B64F 1/352; B64F 1/00; B64F 1/22; B64F 1/315; B64F 1/32; B64F 1/34; B64F 5/20;
(Continued)

(56) References Cited

U.S. PATENT DOCUMENTS

| 11,091,276 | B2 | 8/2021 | Clermont et al. |
| 2013/0168499 | A1* | 7/2013 | Grossman ................ B64D 7/00 |
| | | | 244/135 A |

(Continued)

FOREIGN PATENT DOCUMENTS

| CN | 110516983 A | * 11/2019 | .............. H04W 4/70 |
| EP | 3224142 A1 | 10/2017 | |
| WO | WO-2019025251 A1 | * 2/2019 | .............. B64F 1/364 |

OTHER PUBLICATIONS

Int'l Search Report for PCT/IB2021/000490, dated Mar. 11, 2022.

*Primary Examiner* — Donald J Wallace
*Assistant Examiner* — Jalal C Coduroglu
(74) *Attorney, Agent, or Firm* — MaxGoLaw PLLC

(57) ABSTRACT

An aircraft ground support unit (1) (GSU) for supplying a specific service according to a specific set of service parameters to an aircraft (2) on the ground and consuming a specific service energy is provided that includes:

a rechargeable energy storage unit (3) (RESU) for autonomously delivering the specific service energy required for supplying the specific service in the given available service duration;

an energy sensor (4) for measuring an instantaneous state of energy parameters of the RESU; and a control unit. The RESU, identifying the aircraft (2), identifying in a database the specific set of service parameters for identified aircraft, establishing a specific service energy budget estimate, determining an instantaneous charge level of the RESU, comparing the specific service energy budget estimate with the instantaneous charge level of the RESU, and (Continued)

generating an output signal representative of a capacity of
the RESU to deliver the specific service energy budget
estimate as a function of the instantaneous charge level.

17 Claims, 4 Drawing Sheets

(51) Int. Cl.
*B64F 1/00* (2024.01)
*B64F 1/22* (2024.01)
*B64F 1/315* (2006.01)
*B64F 1/32* (2006.01)
*B64F 1/34* (2006.01)
*B64F 5/20* (2017.01)

(52) U.S. Cl.
CPC ................. *B64F 1/315* (2013.01); *B64F 1/32*
(2013.01); *B64F 1/34* (2013.01); *B64F 5/20*
(2017.01)

(58) Field of Classification Search
CPC .... B64F 1/002; B64F 1/28; B64F 1/30; B64F
5/30; B60L 50/50
See application file for complete search history.

(56) References Cited

U.S. PATENT DOCUMENTS

| | | | |
|---|---|---|---|
| 2018/0229860 A1* | 8/2018 | Clermont .................. | B64F 1/34 |
| 2021/0284357 A1* | 9/2021 | Villa ........................ | B25J 11/00 |

* cited by examiner

(a) Identification of aircraft

(b) Determination of service energy budget estimate

(c) Collect GSU's instantaneous charge levels

(d) Preselect suitable GSU's

(e) ∃? suitable GSU

(f) Generate alert signal

No

Yes

(g) Select a specific GSU based on predefined criteria

AIRCRAFT GROUND SUPPORT UNIT WITH AUTONOMY EVALUATION

FIELD OF THE INVENTION

The invention relates to an aircraft ground support unit (GSU) for supplying a specific service according to specific service parameters to an aircraft on the ground. The GSU consumes a specific service energy for supplying the specific service as a whole in a given service duration. The GSU comprises a rechargeable energy storage unit (RESU) suitable for autonomously delivering the specific service energy when fully charged.

The GSU of the present invention is configured for assessing whether an instantaneous charge level of the RESU is sufficient for autonomously delivering the specific service in its entirety in the given service duration. This prevents having to interrupt the specific service for insufficient autonomy for the delivery of the specific service in its entirety.

BACKGROUND OF THE INVENTION

When stationed at their parking positions between a landing and a take-off, aircrafts require a number of servicing. For example, an aircraft needs refuelling and it must be supplied with electrical and pneumatic or hydraulic power, so that all its powered functions can remain operational with its engines off when parked on the ground. The cockpit needs be heated or cooled down depending on the local weather conditions. An aircraft can need to be towed or taxied from one point to another of the tarmac. Mobile staircases or a transit sleeve can have to be coupled to a door of the aircraft for transit of passengers. These and other services are carried out by corresponding aircraft ground support units (GSU).

Some of these ground support units are mobile, such as fuel trucks, de-icing trucks, taxiing tractors, while others are fixed at least at one point, such as transit sleeves for passenger's transit, pipes for blowing hot or cool air into the cockpit of an aircraft, and the like. Mobile ground support units can be displaced to service aircrafts in separate locations sequentially, thereby reducing the total number of mobile ground support units required for servicing all the aircrafts. Most of the mobile aircraft ground support units include a rechargeable energy storage unit (RESU) such as a battery or a fuel tank. In association with a motor, the RESU is capable of autonomously powering the ground support unit for reaching an aircraft and for delivering a specific service thereto. This eliminates the need for an external power supply point close to all aircraft parking spots where an aircraft can receive a specific service. For the purpose of reducing carbon emissions associated with the servicing of the aircrafts, many airports require GSU's to be powered electrically. The RESU in such electrically powered GSU's can be a battery.

For supplying the entirety of a specific service to an aircraft, an aircraft ground support unit consumes a corresponding amount of specific service energy. This amount depends on the nature of the specific service and on the type of aircraft and airline fretting it. A specific service to a specific aircraft fretted by a specific airline is defined by a specific set of service parameters requiring a corresponding amount of energy for providing the specific service in its entirety. For example, the specific set of parameters for a same specific service (e.g., supplying electric power or conditioned air to an aircraft) can differ from one aircraft type to another of a same airline company (e.g., between an Airbus A320 and a Boeing 747) as well for a same aircraft type of two different airline companies (e.g., for a Boeing 737 fretted by AER LINGUS and by BRITISH AIRWAYS). The corresponding energy consumptions will vary with the set of parameters of a specific aircraft. Local meteorological conditions can also affect the amount of energy required for providing a specific service to a specific aircraft defined by a specific set of service parameter, since a higher energy is required to cool a cabin to a target temperature (e.g., 20° C.) when the outside temperature is 25° C. than when the outside temperature is 40° C.

Before supplying a specific service to an aircraft, an operator of a corresponding ground support unit (GSU) comprising a rechargeable energy storage unit (RESU) must first check an instantaneous charge level of the RESU and compare it with an estimate of the specific service energy required by the GSU to supply the whole specific service. In most cases, the operator relies on its own experience for performing this estimation, which only experienced staff can do with a sufficient level of safety. Further, such estimates, even by highly experienced operators, can only be approximative and not adapted for evaluating a safety margin. An operator is often confronted with a trade-off. On the one hand, choosing a low value of the safety margin can result in an interruption of the servicing in case the operator was too optimistic with its estimate or in case of unexpected events causing an unplanned increase in the specific service energy required for supplying the specific service. In this case, an energy shortage can occur, causing a failure of the GSU to supply the whole specific service. For example, this could occur when an aircraft requires conditioned air or electrical power supply during a turnaround that lasts longer than expected. Such energy shortage can induce an interruption of the servicing during the time a new GSU is brought to replace the first one, or during the time required for loading or refilling the RESU. In the end, the energy shortage can induce delays in the schedule of the serviced aircraft and cause additional financial losses. On the other hand, choosing a higher than required value of the foregoing safety margin leads to additional operator workload due to the more frequent recharging of the RESU. Frequent recharging of each GSU belonging to a fleet also increases an average unavailability time of the GSU's within the fleet, which can yield an oversizing of the fleet and additional costs.

Last but not least, the foregoing trade-off is going increasingly critical in view of the global trend of reducing carbon emissions. This trend drives the development of battery based GSU's recharged with renewable energy. However, the competitiveness of such GSU's is undermined by the high cost and recharging time associated with batteries in general. Long recharging times of the batteries require optimizing the management of a fleet of GSU's.

There remains a need in the art for optimizing the servicing of aircrafts on the ground and, in particular, for a ground support unit capable of accurately determining whether it can supply a specific service as a function of the charge level of its rechargeable energy storage unit. This would allow for reducing the GSU's recharging workload during peak hours of aircrafts turnarounds and for optimizing the size of fleets of GSU's. It would also allow for further optimizing the size and use of batteries in battery based GSU's, and size of the tank in fuel or hydrogen (H2) based GSUs.

The present invention proposes a ground support unit (GSU) for supplying a specific service to an aircraft. The GSU is provided with a Rechargeable Energy Storage Unit (RESU) and a control unit configured for identifying the aircraft to be serviced, extracting a corresponding estimate of a specific service energy amount from a database, and comparing the estimate with an instantaneous charge level of the RESU. Based on this comparison, the control unit generates an output signal representative of a capacity of the GSU to supply the service as a function of the instantaneous charge level of the RESU. These and other advantages of the present invention are presented in the next sections.

SUMMARY OF THE INVENTION

The present invention concerns an aircraft ground support unit (GSU) for supplying a specific service according to a specific set of service parameters to an aircraft on the ground and consuming a specific service energy for supplying the specific service as a whole in a given available service duration. The GSU of the present invention comprises, a rechargeable energy storage unit (RESU) which, when fully charged, is configured for autonomously delivering the specific service energy required for supplying the specific service in the given available service duration, an energy sensor configured for measuring an instantaneous state of energy parameters of the RESU, a control unit configured for, identifying the aircraft, preferably including an aircraft type and preferably an airline, accessing a database comprising:

a list of aircraft types and preferably a list of airlines, sets of service parameters of corresponding services to be supplied to each of the aircraft types and preferably of the airlines of the list, identifying in the database the specific set of service parameters of the specific service to the thus identified aircraft, establishing a specific service energy budget estimate corresponding to the specific set of service parameters by any one of the following the database comprises the specific service energy budget estimate for the specific set of service parameters, and the specific service energy budget is extracted from the database, or the database comprises a generic service energy budget estimate for the specific set of service parameters, the generic service energy budget estimate is extracted from the database, and the specific service energy budget estimate is calculated therefrom, or calculating the specific service energy budget estimate from the set of service parameters and from the thus identified aircraft, accessing the instantaneous state of the energy variables of the RESU measured by the energy sensor, determining an instantaneous charge level of the RESU based on the instantaneous state of the energy variables, The gist of the present invention is that the control unit is further configured for, comparing the specific service energy budget estimate with the instantaneous charge level of the RESU, and for generating an output signal representative of a capacity of the RESU to deliver the specific service energy budget estimate as a function of the instantaneous charge level of the RESU.

The ground support unit can be selected from any one of the following,:

a ground power unit (GPU), a ground preconditioning air unit (PCA), or cabin heater a ground pneumatic (Air Start Unit) or hydraulic power unit, an aircraft de-icing unit, a ground fuel/hydrogen supply unit, an aircraft tow/push tractor, a loading unit for loading cargo, baggage, catering, or equipment, a baggage/freight tractor an aircraft cargo loader a mobile aircraft passenger stair a mobile aircraft baggage/cargo conveyor loader or any combination thereof.

The rechargeable energy storage unit can comprise one or more of:

a battery, a gas tank, a petrol or diesel tank, a hydrogen tank or fuel cell, a compressed air tank.

The output signal can comprise any one of the following,:

a binary output signal indicating whether the instantaneous charge level of the RESU is sufficient or insufficient for autonomously delivering the specific service energy budget estimate in its entirety, output signal indicating an autonomy ratio of the instantaneous charge level of the RESU to the specific service energy budget estimate.u In a preferred embodiment, the control unit is further configured for determining an actual service energy consumption after completion of the specific service, and for updating the database with the actual service energy consumption.

The database can comprise, an internal database hosted in the control unit, and/or a central database remote from the GSU, and in wireless communication with the control unit.

In the latter case, comprising the central database, the control unit can be configured for determining an actual service energy consumption after completion of the specific service supply, and for uploading the actual service energy consumption to the central database. The central database can be coupled to a central database processing unit configured for updating the specific service energy budget estimate based on the actual service energy consumption. The control unit can then be configured for downloading updated service parameters from the central database to the internal database, and for updating the service parameters in the internal database.

The control unit can also be configured for accessing an airport management system and/or an aircraft communication unit to extract one or more aircraft data to complete the specific set of service parameters stored in the database. The aircraft data can comprise one or more of the following:

actual turnaround time available for supplying the specific service, actual arrival and/or departure times, external temperature and/or weather, actual duration of the turnaround, the availability or not near the aircraft of a source of power, actual number of passengers on board, actual weight of the aircraft, actual location of the aircraft including GPS coordinates thereof, actual location of a runway in service including GPS coordinates thereof, actual number of passengers remaining on board of the aircraft during the turnaround or to board the aircraft, actual number of seats in 1$^{st}$ class, business class, and 2$^{nd}$ class, actual distance to be covered by the GSU, actual quantity of baggage to be handled, actual aircraft cabin initial temperature, distance from the parking to the runway, ground air conditioning operated (on/off), aircraft air-conditioning recycling fans status (on/off), number of doors open.

The aircraft data are part of variable parameters whose values are likely to vary at each turnaround. As such, it is not advantageous to store in the database values of such variable parameters in general and aircraft data in particular. They can be used with algorithms together with a generic set of service parameters composed of the service parameters which are stored in the database, to yield a more accurate specific energy budget estimate. The algorithms used can for example give an estimate of the energy budget as a function of one or more of the variable parameters. A variable parameter which is not an aircraft data could for example be the outside temperature, whilst a cabin temperature would be an aircraft data. Both parameters are, however, available either directly from the aircraft or from the airport management system.

For each aircraft type and preferably airline, the sets of service parameters can comprise one or more of the following service parameters:

type of service to be supplied, target temperature of aircraft cabin, aircraft equipment remaining ON during a part of a turnaround, a time average consumption, energy saving guidelines imposed by the airline, estimate of power profile for delivering the service, type of turnaround comprising any one or combination of: cargo loading, night stop, passenger flight turn-around, number of of seats in the cabin, aircraft engine type, aircraft weight.

The specific service energy budget estimate can comprise, a value of a total service energy budget, and/or an energy profile as a function of one or more parameters selected among the service parameters, preferably among the aircraft data as defined in any one of claim 9 or 10.

In a preferred embodiment, the control unit is configured for, during a supply of the specific service, determining an actual instantaneous service power profile, monitoring a deviation between the estimate of power profile for delivering the service and the actual instantaneous service power profile, if the actual instantaneous service power profile exceeds the estimate of power profile for delivering the service by more than 20%, preferably by more than 10%, and/or if the service parameters are modified, establishing an updated specific service energy budget estimate based on the actual instantaneous service power profile and/or on the service parameters which are modified, generating an updated output signal based on the updated specific service energy budget estimate.

The control unit further can comprise a user input interface configured for manually modifying the service parameters or variable parameters by a user.

The present invention also concerns a system for managing a fleet of a plurality of GSU's for supplying a specific service according to specific service parameters to a specific aircraft on the ground comprising:

a plurality of aircraft ground support units (GSU), each comprising:

a rechargeable energy storage unit (RESU) which, when fully charged, is configured for autonomously delivering a specific service energy required for supplying the specific service in a given available service duration, an energy indicator configured for determining an instantaneous charge level of the RESU, a control unit configured for accessing the instantaneous charge level and for communicating with a central control unit (CCU) in wireless communication with the control units of the plurality of GSU's, and configured for, accessing a database comprising:

a list of aircraft types and preferably a list of airlines, sets of service parameters of corresponding services to be supplied to each of the aircraft types and preferably of the airlines of the list, identifying in the database the specific set of service parameters of the specific service to the specific aircraft, establishing a specific service energy budget estimate corresponding to the specific set of service parameters, collecting the instantaneous charge levels of the RESU's of the plurality of GSU's, comparing the specific service energy budget estimate with the instantaneous charge levels of the RESU's, and for preselecting among the plurality of GSU's, suitable GSU's whose RESU's have an instantaneous charge level sufficient for autonomously supplying the specific service in its entirety to the specific aircraft.

selecting among the suitable GSU's, a specific GSU for supplying the specific service to the specific aircraft.

In a preferred embodiment, the CCU is configured for selecting the specific GSU based on one or more of the following criteria:

the instantaneous charge level of the RESU of the suitable GSU's must be sufficient for autonomously delivering the specific service energy budget estimate with an additional safety margin of preferably at least 20%, preferably at least 30%, a distance separating the suitable GSU's from the aircraft or from a servicing area of the aircraft, a capacity of servicing in a row a sequence of one or more aircrafts scheduled for servicing without recharging the RESU of the suitable GSU's, as a function of their respective specific service energy budget estimates, an estimate of a residual charge level of the RESU after completing the specific service and, optionally, followed by completing corresponding specific services to a sequence of one or more aircrafts scheduled for servicing, which does not exceed 20%, preferably 10% of a full charge level, with or without an additional safety margin.

SHORT DESCRIPTION OF THE DRAWINGS

These and further aspects of the invention will be explained in greater detail by way of example and with reference to the accompanying drawings in which.

DETAILED DESCRIPTION OF THE INVENTION

Figure 1:
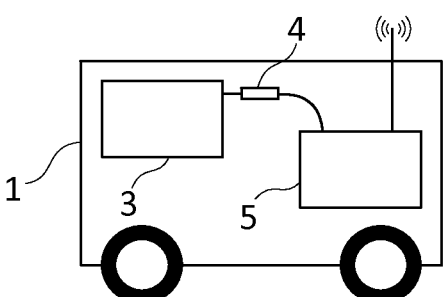
FIG. 1 represents schematically an aircraft ground support unit according to the invention.
Figure 3:
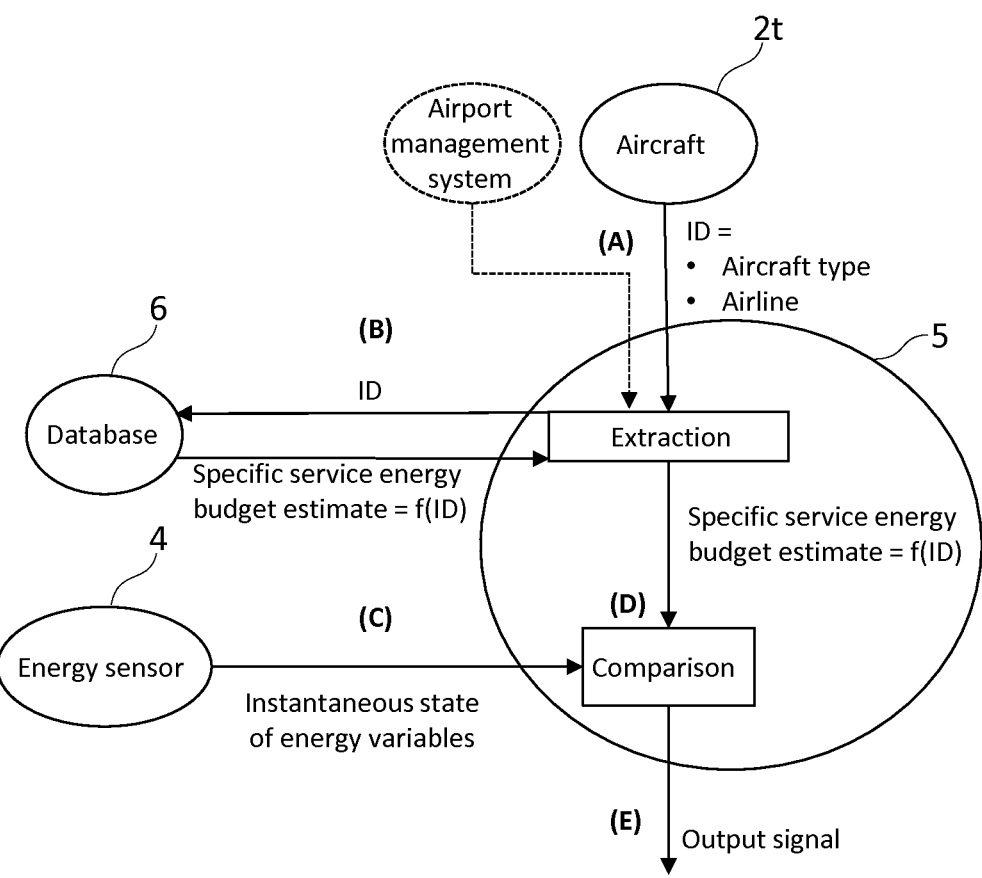
FIG. 3 represents a diagram of traffic of pieces of information exchanged by the control unit with different components comprised in an embodiment of the invention.

The aircraft ground support unit (1) (GSU) of the present invention is configured for supplying a specific service according to a specific set of service parameters to an aircraft (2) on the ground. It is also configured for being energetically autonomous for supplying the specific service as a whole in a given available service duration, in that it does not require to be coupled to an external source of power during the servicing. As illustrated in FIG. 1, the GSU comprises:

a rechargeable energy storage unit (3) (RESU) suitable for autonomously delivering the specific service energy required for supplying the specific service in the given available service duration when fully charged, energy sensor (4) configured for measuring an instantaneous state of energy parameters of the RESU, a control unit (5) configured for, identifying the aircraft (2), preferably including an aircraft type and an airline, accessing a database (6) comprising:

a list of aircraft types and preferably a list of airlines, sets of service parameters of corresponding services to be supplied to each of the aircraft types and preferably of the airlines of the list, identifying in the database the specific set of service parameters of the specific service to the thus identified aircraft, establishing a specific service energy budget estimate corresponding to the specific set of service parameters by any one of the following the database comprises the specific service energy budget estimate for the specific set of service parameters, and the specific service energy budget is extracted from the database, or the database comprises a generic service energy budget estimate for the specific set of service parameters, the generic service energy budget is extracted from the database, and the specific service energy budget estimate is calculated therefrom, or calculating the specific service energy budget estimate from the set of service parameters and from the thus identified aircraft, accessing the instantaneous state of the energy variables of the RESU measured by the energy sensor (4), determining an instantaneous charge level of the RESU based on the instantaneous state of the energy variables, As illustrated in FIGS. 3-(D), 4-(e) and 4-(f), the control unit (5) is further configured for, comparing the specific service energy budget estimate with the instantaneous charge level of the RESU, and for generating an output signal representative of a capacity of the RESU to deliver the specific service energy budget estimate as a function of the instantaneous charge level of the RESU.

Ground Support Unit (1)

FIG. 1 is a schematic view of an aircraft ground support unit (1) (GSU) according to the invention. It comprises a rechargeable energy storage unit (RESU) (3), an energy sensor (4) configured for measuring an instantaneous state of energy parameters of the RESU, and a control unit (5). This GSU is configured for supplying a specific service to an aircraft (2) on the ground during a given available service duration. The given available service duration is limited by a turnaround time when the aircraft is in contact with the ground between two flights. It can further be limited in case the aircraft must be empty during the servicing (e.g., disinfecting the cabin). The specific service supplied by the GSU according to the invention can be of various natures. For example, the GSU can be a ground power unit (GPU) for supplying electrical power to the aircraft, or a ground preconditioning air unit (PCA) or cabin heater for feeding the cabin or cockpit of the aircraft with cooled and/or heated air, or a ground pneumatic power unit for starting aircraft turbines, or a hydraulic power unit, or an aircraft de-icing unit for removing ice from the body of the aircraft, or a ground fuel or hydrogen (H2) supply unit for refuelling the aircraft with kerosene, or an aircraft tow or push tractor for moving the aircraft, or a loading unit for loading or unloading cargo, baggage, catering, or equipment in or from the aircraft such as an aircraft cargo loader or a mobile aircraft baggage or cargo conveyor loader, or a mobile aircraft passenger stair, or a baggage/freight tractor. All foregoing GSU's consume energy for supplying the services they are designed for. The present invention concerns GSU's which are energetically autonomous when they supply the corresponding services.

The GSU according to the present invention is mobile and can move either autonomously or towed by a motorized vehicle. Preferably, the GSU can move autonomously, thus consuming energy from the RESU to move from a first position to a servicing position. This energy consumption must also be taken into account when establishing the specific service energy budget.

Rechargeable Energy Storage Unit (RESU) (3)

The GSU according to the invention comprises a rechargeable energy storage unit (3) (RESU) which delivers energy required for operating the GSU and servicing the aircraft autonomously i.e., the GSU can service the aircraft in the absence of external sources of energy. As a result, it is not required to bring electrical power or a tank truck in the vicinity of each area where an aircraft can be serviced for refuelling or recharging the RESU of the GSU according to the invention. The RESU can comprise one or more of an electrical battery, a gas tank, a petrol or diesel tank, a hydrogen tank or fuel cell, a compressed air tank. Preferably, the RESU can also deliver energy to a motor for moving the GSU on an airport apron, or to other internal equipment of the GSU requiring energy such as emergency or control equipment.

The RESU (3) in the GSU according to the invention is suitable for, when fully charged, autonomously delivering the entirety of a specific service energy required for supplying the specific service i.e., an amount of energy consumed by the GSU for supplying the specific service as a whole in the given available service duration. The given available service duration can impact the specific service energy. For example, a GSU suitable for supplying conditioned air to cool down an aircraft cabin from a (high) starting temperature to a (low) target temperature operates at a different operating point and with a different efficiency depending on the duration of the cooling service (e.g., service duration of 10 minutes vs 120 minutes). The power required for supplying a specific service energy budget depends on the duration of the service (i.e., power is the ratio of energy to time). As a result, the specific service energy corresponding to the foregoing example of service described will differ accordingly. In a preferred embodiment of the invention, the RESU (3) is suitable for delivering a maximum rated power to the GSU comprised between 0 and 500 KW and has a capacity comprised between 0 and 500 kWh. The RESU can comprise a battery having a nominal capacity sufficient for autonomously delivering energy to the GSU to supply the specific service in its entirety.

Energy Sensor (4)

The GSU according to the invention is configured for determining an instantaneous charge level of the RESU. It comprises an energy sensor (4) configured for measuring instantaneous energy variables of the RESU. The instantaneous energy variables of the RESU can be a signal representative of the instantaneous charge level of the RESU, for example a quantity of liquid fuel remaining in a fuel tank or a remaining electrical energy which can be extracted from a battery without altering battery performance. Alternatively, and especially in the case of battery-based GSU's, the instantaneous energy variables can also be a signal only indirectly representative of the instantaneous charge level of the RESU, such as for example a current, a voltage, or a power measurement, and the energy sensor is preferably configured for instantaneously measuring the voltage of the battery, or the current or power fed to or drawn from the battery of the RESU. What is important is that the signal measured by the energy sensor can directly or indirectly be converted into a value of the instantaneous charge level of the RESU by the control unit.

The type and model of energy sensor selected does not affect the present invention, as long as the GSU is capable of measuring an instantaneous level of energy left in the RESU. The energy sensor (4) is in communication with the control unit and is capable of instantaneously determining the state of the energy variables of the RESU at any time (cf. FIGS. 3-(C) and 4-(d)).

Control Unit (5)-Part 1: Data Collection

The GSU according to the invention comprises a control unit (5) which centralizes all information from the aircraft, internal and/or external databases, and processes the information. The control unit of the GSU is configured for identifying the aircraft (2) to be serviced, preferably including an aircraft type, and an airline of the aircraft. In a preferred embodiment of the invention illustrated in FIGS. 2 and 3, the control unit (5) is configured for connecting remotely to a transponder (2t) and/or for receiving any other wireless signal of the aircraft for automatically identifying the aircraft, preferably via HF, UHF, or WIFI. Preferably, the control unit further comprises a user input interface suitable for identifying the aircraft by a user i.e., for inputting aircraft identification information preferably comprising a type of the aircraft and an airline fretting the aircraft (cf. FIG. 4-box (a)). The control unit is configured for accessing a database to access and/or extract a specific set of service parameters corresponding to the specific service to be supplied to the thus identified specific aircraft.

Figure 4:
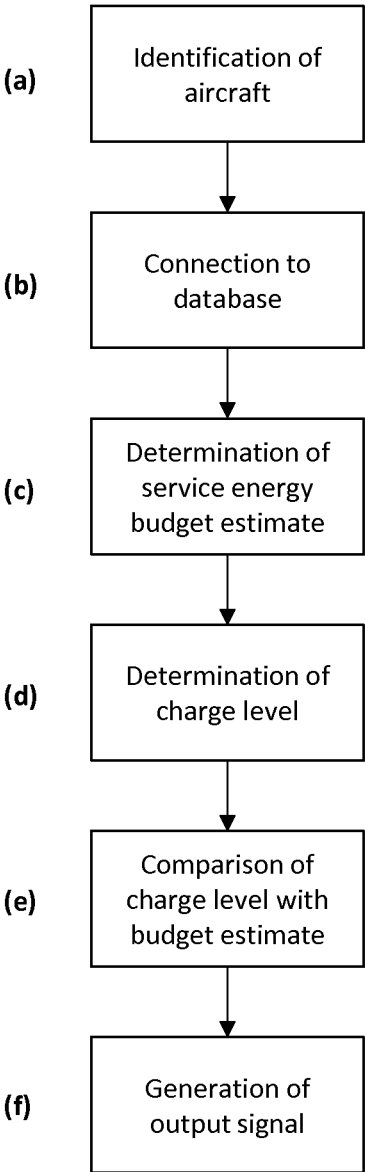
FIG. 4 represents a flow chart of successive operations performed by the control unit in the aircraft ground support unit according to an embodiment of the invention.

FIGS. 3 and 4 illustrate the functioning of the control unit (5) that are detailed in the following paragraphs. FIG. 3 is a schematic view of an example of exchanges and processing of information between the control unit and other elements, both external elements, such as the aircraft or an external database, and internal elements of the GSU such as the energy sensor or an internal database. FIG. 4 is a schematic view of an example of successive operations performed by the control unit.

TABLE 1

| Example of database architecture according to the invention | | | |
|---|---|---|---|
| Aircraft type | Airline | Service Type and set of service parameters | Specific or Generic service energy budget estimate (Kijk)* |
| type 1 | Airline 1 | Cabin air conditioning Cabin target T° = T1 Number of screens ON: N1 Nb of passengers on board: N2 Duration of the operation: D1 | K111 kWh |
| type 1 | Airline 1 | Kerosene refuelling Statistical average amount of kerosene to be pumped . . . | K112 kWh |
| type 1 | Airline 2 | Electrical powering Number of screens ON: N ACU status: ON/OFF . . . | K121 kWh |
| type 2 | Airline 3 | Cabin air conditioning Cabin target T° = . . . | K231 kWh |

TABLE 1-continued

| Example of database architecture according to the invention | | | |
|---|---|---|---|
| Aircraft type | Airline | Service Type and set of service parameters | Specific or Generic service energy budget estimate (Kijk)* |
| | | Number of screens ON: . . . Duration of the operation or departure time: | |
| type 3 | Airline 3 | Cabin air conditioning Cabin target T° = . . . | K331 kWh |
| type 4 | Airline 3 | Aircraft engine start Engine type | K431 kWh |
| type 5 | Airline 3 | . . . | K53k kWh |

*Kijk, wherein i = aircraft type, j = airline, and k = service parameters

Database (6)

The control unit (5) in the GSU according to the invention is further configured for accessing a database (6). An example of architecture of such database is represented in Table 1. The database according to the invention can comprise at least two kinds of data, preferably three kinds of data . A first kind of data is a list of aircraft identification data including a list of aircraft types and preferably a list of airlines. For example, aircrafts types can be Airbus A320 or Boeing 747, and airlines can be BRITISH AIRWAYS or LUFTHANSA.

A second kind of data consists of sets of service parameters of corresponding services to be supplied to each of the aircraft types of the list of aircraft types and preferably of the airlines of the list of airlines. The service parameters can comprise any one or combination of: a type of service to be supplied, for example loading cargo in the aircraft or de-icing the aircraft body; a target temperature of cabin of the aircraft for conditioning the aircraft cabin air, for example 18° C.; a list of aircraft equipment's remaining ON during a part of a turnaround, for example flight control equipment or safety equipment or cabin screens; a rated time average consumption, for example an average electrical consumption of the aircraft during a turnaround; energy saving guidelines imposed by the airline, for example a switching off of the cabin lights and screens during turnarounds by the cabin crew; an estimate of power profile for delivering the service to the aircraft, for example values of average electrical consumption of the aircraft as a function of time during a turnaround of typical duration; a type of turnaround which impacts the service to be delivered, for example supplying electrical power to the aircraft can depend on whether the turnaround is a night stop or a transit, a passenger flight turn-around or a cargo loading; supplying air conditioning will depend on whether passengers are staying or leaving the aircraft during the turnaround.

The sets of service parameters can be saved in the database by the types of services they define. Some GSU's are dedicated to one type of service only, e.g., preconditioned air units (PCA), and these GSU's will access the sets of service parameters of the types of services they are dedicated to only. For multi-function GSU's, e.g., a combined ground power unit (GPU) and preconditioning air unit (PCA), the control unit (5) can retrieve the type of service to be supplied either from the aircraft or from an airport management system. Alternatively, an operator can enter the type of service to be supplied to a given aircraft through a user input interface.

In a preferred embodiment of the invention, the service parameters can also comprise any one or combination of: a distance to be covered by the GSU, for example a distance from a recharging or parking location of the GSU to an aircraft servicing area; a quantity of baggage to be handled, for example a number of passenger bags or a total weight of passenger bags; a number of passengers on board of the aircraft, for example before aircraft landing or remaining in the aircraft during the turnaround; an aircraft engine type; an aircraft cabin initial temperature before a beginning of servicing, an aircraft weight, a distance from a aircraft parking area to an aircraft runway; a 'ground air conditioning operated' information (on/off), for example representative of a turning on of the aircraft air conditioning system while the aircraft is on ground; an aircraft air-conditioning recycling fans status (on/off) ; weather information, for example current weather conditions or forecast of weather conditions in an airport where the aircraft is or will be serviced, comprising sun/humidity/temperature information; an aircraft departure time; an aircraft arrival time. The foregoing service parameters can be stored in the database or available from an airport management system (7) and/or an aircraft communication unit. The GSU can be in communication therewith to retrieve the required service parameters.

The control unit in the GSU according to the invention is configured for identifying in the database the specific set of service parameters of the specific service to the previously identified aircraft. Among the sets of service parameters corresponding to the type of service to be supplied to the previously identified aircraft, the specific set of service parameters of the specific service is selected by the control unit of the GSU.

The database can also comprise a service energy budget estimate corresponding to the sets of service parameters comprised in the database. In one embodiment, the database comprises, at least for a selection of sets of service parameters, a specific service energy budget estimate accounting for all the parameters of a given set of service parameters. A large amount of data is required to complete such database, since it is clear that for a same specific service to a same specific aircraft type, the service energy budget estimate can vary substantially from one airline to another, or even between two turnarounds. For example, some aircrafts may vary their requirements according to instant parameters, such as the actual weather, the configuration of the seats in tourist, business and first classes, and the like. This makes a comprehensive list of specific service energy budget estimates quite difficult to keep up to date.

In a preferred embodiment, the database can comprise a generic service energy budget estimate taking a selection only of the parameters into account, such as the type of aircraft, or the airline company, but not of all the parameters, referred to as variable parameters, such as for example, the target temperature of the cabin, which can vary depending on the weather outside, or the initial temperature in the cabin upon aircraft arrival. The control unit (5) can be configured to run an algorithm calculating the specific service energy budget estimate based on the generic service energy budget estimate and on actual values of the variable parameters which can be retrieved e.g., from the aircraft, the airport management system, or entered by an operator through the user input interface. Different routes for establishing a specific service energy budget estimate are detailed in the section "control unit (5)-Part 2 . . . " below.

The variable parameters can comprise aircraft data, which can vary with each turnaround. As such, it is not convenient to store any such value in the database, as it is unlikely that any of the aircraft data be constant between two turnarounds. The aircraft data can include one or more of, actual turnaround time available for supplying the specific service, actual arrival and/or departure times, external temperature and/or weather, actual duration of the turnaround, the availability or not near the aircraft of a source of power, actual number of passengers on board, actual weight of the aircraft, actual location of the aircraft including GPS coordinates thereof, actual location of a runway in service including GPS coordinates thereof, actual number of passengers remaining on board of the aircraft during the turnaround or to board the aircraft, actual number of seats in $1^{st}$ class, business class, and $2^{nd}$ class, actual distance to be covered by the GSU, actual quantity of baggage to be handled, actual aircraft cabin initial temperature, distance from the parking to the runway, ground air conditioning operated (on/off), aircraft air-conditioning recycling fans status (on/off), number of doors open.

The control unit can collect any one of the aircraft data by communicating directly with eh aircraft and/or with the airport management system. Alternatively, it can be entered manually by an authorized operator via the user input interface. The aircraft data can be used to complete a given set of service parameters which is generic, because incomplete, to make it more specific allowing a better estimate of the energy required for completing the specific service.

As discussed supra, the specific service energy budget estimate can be stored in the database or can be calculated from a generic service energy budget, taking account of instant values of variable parameters. In some case, a service energy budget estimate can be stored in the database as a specific one but used by the central controller (5) as a generic one, because the values of one or more parameters may differ from the values indicated in the specific set of service parameters associated therewith. An algorithm can be used to adapt the budget estimate to the actual values of the specific set of service parameters. A service energy budget estimate is considered to be a specific or a generic service energy budget estimate depending on wether the values of all or a selection only of the parameters of the corresponding specific set of service parameters are equal to the actual values of the service parameters. For this reason, the expression "service energy budget estimate" is used to collectively refer to both "specific" and "generic" service energy budget estimates.

The service energy budget estimates can comprise at least a value of a total service energy budget i.e., a total amount of energy required by the GSU for supplying the service as a whole and in the given available service duration to the aircraft. This service energy budget estimate can be a prediction from a theoretical model of the GSU and aircraft or can result from statistics based on historical data or measurements. For example, the service energy budget estimate can be obtained by calculating an average of measurements of the amount of energy consumed by one or more GSUs for delivering as a whole the service in the past, to which a safety margin (e.g., of 20%) is added. In a preferred embodiment of the invention, the service energy budget estimate is a statistical average of past measurements of the energy consumed by different GSUs for delivering the service according to the same set of parameters, and thus to aircrafts having the same aircraft type and airline, to which a safety margin (e.g., of two times the standard deviation of the past measurements considered for calculating the statistical average) is added.

The service energy budget estimate comprised in the database or calculated by the control unit according to the invention can also comprise an energy consumption profile as a function of service time of the RESU corresponding to a specific set of service parameters for a specific service. This can include values and time variations of estimated energy delivered by the RESU to the GSU for supplying the specific service as a function of time during the supply of the specific service, or as a function of one or more parameters selected among the service parameters. In a same way as for the total service energy budget, the energy profile as a function of service time can be obtained from statistics based on historical data.

Internal or Remote Database

The database (6) according to the invention can comprise an internal database hosted in the control unit (5) of the GSU, and/or a central database remote from the GSU and in wireless communication with the control unit (5), for example a cloud-based database. In the latter case, the control unit of the GSU can also comprise an antenna and be configured for accessing the internet and communicating with the central database via for example Wi-Fi of a mobile network or radio frequency. The database can also comprise an internal database and a central database which is complementary to the internal database.

Preferably, the internal database hosted in the control unit of the GSU is updated at regular intervals with up-to-date data. In a preferred embodiment of the invention, the control unit is configured for automatically updating the internal database at intervals, for example while the RESU of the GSU is being recharged. For example, the up-to-date data including updated values of the service energy budget estimates can be downloaded from the central database or an alternative database remote from the GSU to the local database via a 4G mobile network. If the database comprises an energy consumption of the RESU of the GSU as a function of service time, this information is preferably stored in an internal database. Preferably, the control unit is also configured for downloading updated service parameters from the central database to the internal database, and for updating the service parameters in the internal database.

Preferably, the service parameters in the database can be modified manually by an operator through the user input interface. Preferably, the service parameters in the internal database can be downloaded from the central database.

Control Unit (5)—Part 2: Energy Budget Estimate And Output Signal

The control unit (5) is configured for establishing the specific service energy budget estimate required for supplying the specific service to the identified aircraft, according to the specific set of service parameters. The control unit (5) can be configured for establishing the specific energy budget estimate by different methods. For example, these include, Retrieving the specific service energy budget estimate as stored in the database, or Retrieving a generic service energy budget estimate as stored in the database and calculating the specific service energy budget estimate to adapt the generic budget estimate to the actual values of the parameters, or Calculating the specific service energy budget estimate from a limited number of parameters such as aircraft type or volume.

As discussed supra, a service energy budget estimate is considered to be a specific or a generic service energy budget estimate depending on whether the values of all or a selection only of the parameters of the corresponding specific set of service parameters are equal to the actual values of the service parameters required for the specific service to be supplied. For this reason, the control unit (5) must be configured for checking whether a specific service energy budget estimate is available and whether it can be applied to the specific aircraft as such. If the specific service energy budget estimate is not available for the specific aircraft to be serviced, the control unit can be configured for comparing the parameter values of the sets of parameters of aircraft types similar to the specific aircraft to be serviced and to select the closest set of service parameters as the generic service energy budget estimate to start with to establish the specific service energy budget estimate. The closest set of service parameters is the one having less differing parameter values from the specific set of service parameters, or the one having one or more differing parameters for which an algorithm is available for adapting the service energy budget estimate as a function of the one or more differing parameters. The control unit must then be configured for selecting an algorithm capable of adapting the generic service energy budget estimate as a function of the differing service parameters. If no such algorithm is available, the control unit can look for an alternative generic service energy budget estimate characterized by alternative differing parameters, which can be modelled by an algorithm.

If no generic service energy budget estimate close enough to the specific set of service parameters is available in the database (e.g., the database may comprise no aircraft type similar to the specific aircraft to be serviced), then the control unit (5) can be configured for using an algorithm for calculating the specific service energy budget estimate from a limited number of data, such as volume, or weight of the aircraft. Such energy budget estimate is of course less accurate than if a specific or even a suitable generic service energy budget estimate is available, but it gives a precious information for rare cases of unusual aircrafts to be serviced.

Specific Service Energy Budget Estimate Available in the Database

In a first embodiment, the database comprises the specific service energy budget estimate for the specific set of service parameters, and the control unit is configured for extracting the specific service energy budget estimate stored in the database without modifying it. For example, this can be the case if the aircraft identification information and the specific set of service parameters required for accurately determining the specific service energy budget estimate are available, and if the database comprises a value of the specific service energy budget estimate which is based thereon. This situation is quite frequent for well-established flights of an airline company starting from an airport. For example, although the service energy budget estimate for conditioning the air of a specific aircraft cabin is highly impacted by the outside temperature determining the air intake temperature of the air conditioning unit and the initial cabin temperature, a specific service energy budget estimate can be stored in the database tor a range of outside temperatures and cabin temperatures. If the control unit can access the aircraft cabin temperature and the outside temperature, and if they fall within the temperature ranges defined in the set of service parameters, the specific service energy budget estimate stored in the database can be extracted by the control unit (5) and used as such to define the specific service energy budget estimate for the specific service to be supplied to the specific aircraft.

Generic Service Energy Budget Estimate Available in the Database

In a second embodiment, the database comprises a generic service energy budget estimate for the specific set of service parameters, in that the set of parameters corresponding to the generic service energy budget estimate comprises one or more differing parameters having different values than the actual specific set of service parameters. These one or more differing parameters are referred to as variable parameters and, as discussed supra, can comprise aircraft data available directly from the aircraft or from the airport management system. The control unit is configured for selecting and extracting the most suitable generic service energy budget estimate from the database, and the specific service energy budget estimate is calculated therefrom by implementing predefined algorithms defining the service energy budget estimate as a function of the one or more variable parameters. For example, referring to the example given supra of a specific service of conditioning the air of a specific aircraft cabin, wherein the database comprises a service energy budget estimate for given ranges of the outside temperature and of initial cabin temperature, whilst the actual outside and/or initial cabin temperatures fall out of these ranges, the corresponding service energy budget estimate can be used as generic service energy budget estimate, and an algorithm can be used to adapt the service energy budget estimate to the actual outside and/or initial cabin temperatures to establish the specific service energy budget estimate. Again the control unit (5) can access the aircraft cabin temperature and the outside temperature by communicating with the aircraft and/or with the airport management system.

Other examples of likely variable parameters include but are not limited to duration of the service, the number of seats in tourist, business, and first class, actual temperatures, the number of passengers on board during a service, the weight of luggage, distances to be run by the GSU, number of screens (ON/OFF), status ONOFF of an auxiliary power unit (ACU), and the like. The actual values of the variable parameters can be made available to the control unit, either by communicating with the aircraft, or with the airport management system, or can be entered manually by an operator via an input user interface. Algorithms giving a variation of the service energy budget estimate as a function of different variable parameters can be simple or complex and the type of algorithms and how they are developed are not restricted by the present invention. The control unit selects and runs the one or more available algorithms giving the variations of the service energy budget estimate as a function of the one or more variable parameters.

No Suitable Specific or Generic Service Energy Budget Estimate Available in the Database In case the control unit can find no suitable specific or generic service energy budget estimate corresponding to the specific aircraft to be serviced, or if no algorithm is available addressing the variable parameters, the control unit can calculate the specific service energy budget estimate "from scratch", based on a limited number of data, such as size, volume, weight, of the aircraft, and the like. An algorithm can be used giving an approximation of the specific service energy budget estimate which is less accurate than when based on a specific or generic service energy budget estimate but giving a good enough approximation This can be the case when an unusual aircraft, not regularly scheduled to land at a given airport. Although rather rare, this could happen at large scale in case of an airport hosting an air show.

Instantaneous State of the RESU

As illustrated in FIG. 3, the control unit in the GSU according to the invention is also configured for accessing the instantaneous state of the energy variables of the RESU measured by the energy sensor (4), and for determining an instantaneous charge level of the RESU based on the instantaneous state of the energy variable. The instantaneous state of the energy variables measured by the sensor (4) in the present invention are such that the instantaneous charge level of the RESU can be derived therefrom. Non exhaustive examples of energy variables include a level of a float in a tank containing a fluid combustible, or a voltage or current measured between the electrodes of a battery, or a conductivity of an ionic solution, and the like. Any energy variable can be used in the present invention which allows the control unit (5) to determine therefrom the instantaneous charge level of the RESU.

The control unit is configured for determining the instantaneous level of charge of the RESU based on the value of the instantaneous state of the energy variables of the RESU measured by the energy sensor (4). If the energy variable is a direct measure of the instantaneous level of charge of the RESU, then the task of the control unit is simplified as it can use this value directly. For example, the level of a float in a cylindrical tank of a liquid combustible is directly indicative of the instantaneous level of charge of the RESU. By contrast, if the energy variable is only indirectly linked to the instantaneous level of charge of the RESU, the control unit must convert the value of the energy variable measured by the energy sensor into a value of the instantaneous level of charge of the RESU. For example, the level of a float in a tank of a liquid combustible having a complex geometry is not directly indicative of the instantaneous level of charge of the RESU, and the control unit must relate the value of the level of the float to the level of a float in a cylindrical tank of a liquid combustible is directly indicative of the instantaneous level of charge of the RESU. Another example is if the energy variable is an intensity or voltage measured at the electrode contacts of a battery.

The control unit is also configured for comparing the specific service energy budget estimate with the instantaneous charge level of the RESU. This comparison can consist of determining whether the specific service energy budget estimate (Ee) is higher or lower than the instantaneous charge level (Er) of the RESU (i.e. Ee>Er or Ee<Er). It can also consist of computing an autonomy ratio (Er/Ee) of the instantaneous charge level (Er) of the RESU to the specific service energy budget estimate (Ee). The calculation of the ratio (Er/Ee) is advantageous, in particular in case of the management of a fleet of GSU by a central controlling unit (CCU) as discussed later. A first information is available if Er/Ee<1, then the GSU does not have the sufficient autonomy to carry out the specific service in its entirety without interruption. If the autonomy ratio Er/Ee≥1, then the GSU has the sufficient autonomy and the higher the ratio, the higher the safety of completing the specific service even in case of unexpected events. The ratio Er/Ee can also be used to schedule a sequence of services on different aircrafts in a row. For example, if the specific service consists of towing an aircraft over a given distance from a parking area to a take-off runway, the autonomy ratio Er/Ee can be used to assess a maximum distance over which the GSU can tow the aircraft considering the charge level of the RESU, or a number of times the GSU can supply the specific service of towing the aircraft over the given distance. for a certain aircraft and turnaround associated parameters.

Output Signal

The control unit is configured for generating an output signal representative of a capacity of the RESU to deliver the specific service energy budget estimate depending on the instantaneous charge level of the RESU. The instantaneous charge level of the RESU may be sufficient or not for providing the specific service energy budget estimate. The output signal can be an alphanumeric signal, a light signal or an acoustic signal. The output signal can be binary or boolean, continuous, analog or digital, clear text or encrypted, or a combination thereof. The output signal can be a text message sent to a mobile phone of an operator of the GSU servicing the aircraft and/or to the pilot. It can comprise any one or combination of the following: a binary output signal being in a first or in a second state of the binary signal if the instantaneous charge level of the RESU is sufficient or insufficient, respectively, for autonomously delivering the specific service energy budget estimate. In this case, the output signal can be such that if the instantaneous charge level of the RESU is sufficient for autonomously delivering the specific service energy budget estimate, the output signal is positive, and if the instantaneous charge level of the RESU is insufficient for autonomously delivering the specific service energy budget estimate, the output signal is negative. The information of whether or not a GSU has the energy autonomy for providing the specific service to the specific aircraft in its entirety is essential for an efficient management of a fleet of GSU's. The present invention can, however, give more information to further optimize the management of the GSU's.

The output signal can be a signal representative of an autonomy ratio of the instantaneous charge level of the RESU to the specific service energy budget estimate. This information is precious at the time of deciding which GSU of a fleet of GSU's is most appropriate for servicing a specific aircraft. For example, first, second, and third GSU's can have autonomy ratios of 105%, 120%, and 200% relative to a specific service energy budget, and the selection of any one of the first, second, and third GSU's, all capable of ensuring the specific service in its entirety, can be made according to predefined criteria. For example, one possible criterion could be the autonomy for servicing a next specific aircraft, or of using most of the instantaneous energy level available, so that the corresponding RESU's are loaded only when they are substantially empty. In case the RESU comprises a battery, a second possible criterion could be the limitation of a discharge depth recommended for maximizing the service life of the battery. For example, if the recommended discharge depth were 15%, then the required autonomy ratio for supplying a specific service in its entirety would be 115%. The autonomy ratio is also useful to define a margin or excess of charge level available, either in case of unexpected prolongation of the servicing time or in prevision of a next service on another aircraft.

In a preferred embodiment of the invention, the output signal further comprises a RESU autonomy signal representative of a maximum servicing duration of the aircraft, in hours for example. The maximum servicing duration corresponds to a maximum duration of the specific service and can be assessed based on the autonomy ratio and on the energy profile as a function of time or other relevant service parameters comprising distance or number of baggage's to handle for example, or on an average consumption of the GSU corresponding to the specific service. The time dependent consumption can be available in the database and retrieved therefrom by the control unit.

Airport Management System Access

Figure 2:
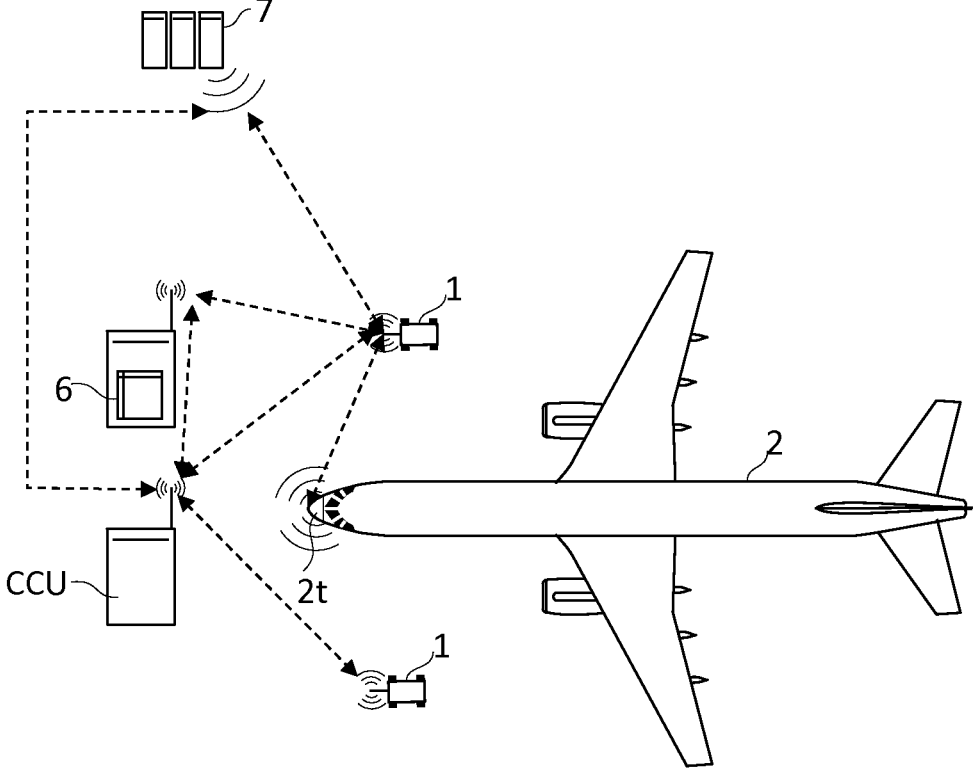
FIG. 2 represents schematically two aircraft ground support units in communication with an aircraft transponder, a remote database, a central control unit (CCU), and an airport management system according to the invention.

In a preferred embodiment of the GSU of the invention already addressed supra, the control unit is further configured for accessing an airport management system (7) to extract additional data from the airport management system to complete the data extracted from the database (6). Preferably, the control unit is also configured for adapting the specific service energy budget estimate to one or more of the additional data. An example of such embodiment is schematically represented in FIG. 2, wherein the GSU (1) can communicate remotely with the central database (6), the airport management system (7), and the transponder (2t) or other communication means of the aircraft. For example, the additional data provided by the airport management system can comprise, a location of the aircraft (e.g., GPS coordinates, or parking spot identification), location of the runway in service (GPS coordinates), a time of arrival and departure of the aircraft (e.g., SITA and/or AIRINC air transport databases) and corresponding turnaround duration limiting the servicing time, duration of the turnaround, the availability or not near the aircraft of a source of power, external temperature near a servicing area of the aircraft, which can impact a performance of a RESU comprising a battery, number of passengers on board (transit or end destination), which can impact the specific service energy budget estimate for unloading baggage and for powering the aircraft equipment such as individual display screens; number of seats in $1^{st}$ class, business class, and $2^{nd}$ class, which can impact the specific service energy budget estimate associated with supplying electrical power to the aircraft, weight of the aircraft.

Preferably, the generic service energy budget estimate saved in the database for one or more sets of service parameters is established for standard conditions. As explained supra, the control unit can comprise algorithms for adapting the generic service energy budget estimate thus saved in the database to specific conditions characterized by the variable parameters, to yield the specific service energy budget estimate. The variable parameters can comprise e.g., the number of passengers on board, number of 1st class, 2nd class and business class seats, weight of baggage in cargo, external temperature, different turnaround durations, and additional data provided by the airport management system. The control unit (5) can then use the specific service energy budget estimate calculated based on the generic service energy budget estimate for generating the output signal as described supra.

In an embodiment of the GSU according to the invention, the control unit is configured for, during a supply of the specific service:

determining an actual instantaneous service power profile, for example by saving the instantaneous charge level of the RESU at regular intervals starting from the beginning of the supply of the specific service, monitoring a deviation between the actual instantaneous service power profile and an estimate of power profile for delivering the service being for example a profile of an estimate of the energy delivered by the RESU during the supply of the specific service as a function of time, if the actual instantaneous service power profile deviates from the estimate of power profile for delivering the service by more than 20%, preferably by more than 10% at a given point in time during the supply of the specific service and/or, if the service parameters are modified during the supply of the specific service, then establishing an updated specific service energy budget estimate based on the actual instantaneous service power profile and/or on the service parameters which are modified, generating an updated output signal based on the updated specific service energy budget estimate.

The above configuration of the control unit is useful in the case of an unexpected event leading to a consumption of energy from the RESU deviating from, in particular exceeding an initial specific service energy budget estimate. For example, an overconsumption of energy from the RESU by a GSU conditioning the air in an aircraft cabin can arise if more than a usual number of doors of the aircraft remain open during the air conditioning of the aircraft or in case the duration of the turnaround is increased for any reason. The control unit can then generate a corresponding updated output signal. For example, either the GSU is capable of supplying the service in its entirety including the unexpected event, or it can indicate how much autonomy is left, which also indicates the time available for bringing a new GSU for finishing the specific service without interruption. Preferably, the control unit of the GSU according to the invention is configured for sending an alert signal in case the updated output signal corresponds to an anticipated failure of the GSU to supply the service in its entirety. For example, the alert signal can be a text message, or an email sent to an operator.

The updated output signal can be a text message sent to a mobile phone of an operator of the GSU servicing the aircraft. In another preferred embodiment of the invention, the GSU comprises a user input interface configured for allowing operators to send requests to the control unit and to access, add data or modify the additional data downloaded from the airport management system and/or the sets of service parameters that are stored in the database. For example, the operator can enter manually updated data in the operating unit through the user input interface, such as for example a manually updated data on the turnaround time available for supplying the specific service, which could be caused by a change of the departure time of the aircraft, a technical problem, or the like. In another example, the operator can enter manually updated service parameters in the database through the user input interface. Preferably, the operator can send a request for an updated output signal to be generated by the control unit that is based on the manually updated data, in combination with the sets of service parameters that are stored in the database and, if available, the data from the airport management system.

Database Automatic Update

In a preferred embodiment of the invention, the control unit of the GSU is further configured for determining an actual service energy consumption after completion of the specific service, and for uploading the actual service energy consumption to the database. The GSU can also communicate additional data provided by the airport management system or manually updated data entered through the user input interface to optimize the algorithms used for adapting the specific service energy budget estimate to different local situations. The correction of the algorithms can be made manually by a human programmer, or it can be adapted by the control unit by artificial intelligence, building up over accumulated data corresponding to various local situations of a same specific service.

Similar to the specific service energy budget estimate and to the generic service energy budget estimate, the actual service energy consumption can comprise only a total actual service energy consumption required for completing the specific service, or it can comprise more information, such an energy consumption profile as a function of service time or as a function of other service parameters, for example a towing distance or number of baggage's to handle. For example, uploading the actual service energy consumption to the database can consist of replacing a previous value of the specific service energy budget estimate corresponding to the specific set of service parameters in the database. It can also consist in replacing a previous value of the generic service energy budget estimate corresponding to the specific set of service parameters in the database. Preferably, this consists of adding the actual service energy consumption to a list of past actual service energy consumptions corresponding to the specific set of service parameters and comprised in the database, preferably in the central database remote from the GSU. In this case, the central database is preferably coupled to a central database processing unit configured for updating the generic or specific service energy budget estimate corresponding to the specific set of service parameters based on the actual service energy consumption. Preferably, the central database processing unit is configured for computing statistics based on the previous list and for deriving an updated value of the generic or specific service energy budget estimate and/or an updated value of the rated time average consumption comprised in the specific set of param-eters, and for replacing the previous value of the generic or specific service energy budget estimate and/or of the rated time average consumption with the corresponding updated values in the database. Preferably, the control unit is con-figured for uploading and adding the actual service energy consumption to the list of past actual service energy con-sumptions after completion of the specific service. Prefer-ably, the central database comprises other lists of other past actual service energy consumptions corresponding to each of the sets of service parameters comprised in the central database, or to one or more of the sets of service parameters comprised in the central database. Preferably, the control unit is configured for accessing and reading the list of actual service energy consumption and the other lists of other actual service energy consumptions. Preferably, the user input interface of the GSU is configured for allowing operators to read the list of actual service energy consump-tion and the other lists of other actual service energy consumptions stored in the database.

System Comprising A Fleet of a Plurality of GSU's

The invention also comprises a system for managing a fleet of a plurality of GSU's for supplying specific services according to specific service parameters to specific aircrafts (2) on the ground. This system comprises a plurality of aircraft ground support units (GSU) according or not to the invention. Each GSU comprises:

a rechargeable energy storage unit (3) (RESU) which, when fully charged, is configured for autonomously delivering a specific service energy required for sup-plying the specific service in a given available service duration, an energy indicator (4) configured for determining an instantaneous charge level of the RESU, a control unit (5) configured for accessing the instanta-neous charge level and for communicating with the central control unit (CCU).

For example, the plurality of GSU's belong to a fleet of GSU's of an airport. The system also comprises a central control unit (CCU) in wireless communication with the control units (5) of the plurality of GSU's. The CCU is configured for:

accessing a database (6) comprising:

a list of aircraft types and preferably a list of airlines, sets of service parameters of corresponding services to be supplied to each of the aircraft types and prefer-ably of the airlines of the list, identifying in the database the specific set of service parameters of the specific service to the specific air-craft, establishing a specific service energy budget estimate corresponding to the specific set of service parameters, collecting the instantaneous charge levels of the RESU's of the plurality of GSU's, preferably after identifying and localizing the GSU's in an airport area, for example, comparing the specific service energy budget estimate with the instantaneous charge levels of the RESU's, and for preselecting among the plurality of GSU's, suitable GSU's whose RESU's have an instantaneous charge level sufficient for autonomously supplying the specific service in its entirety to the specific aircraft, selecting among the suitable GSU's, a specific GSU for supplying the specific service to the specific aircraft.

Figure 5:
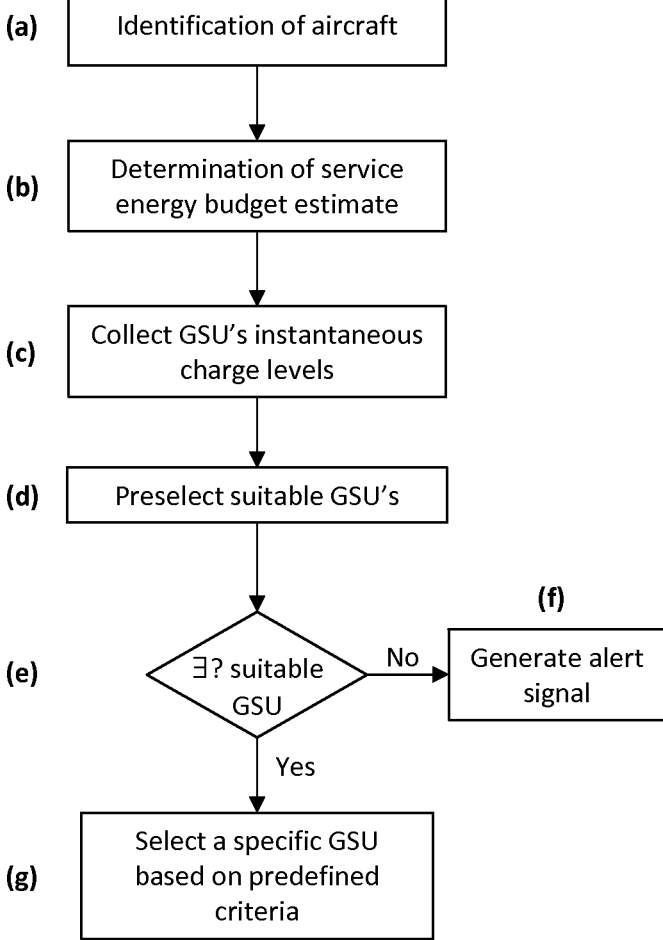
FIG. 5 represents a flow chart of successive operations performed by a system comprising a central control unit managing a plurality of aircraft ground support units.

In the preferred embodiment of the invention illustrated in FIG. 5, the CCU is configured for identifying the aircraft to be serviced in similar ways as the control unit of the GSU's described supra, for example via connecting to the transponder or other communication means of the aircraft, such as ACARS or via other input means such as a CCU user interface. Preferably, the CCU is configured for accessing the database, more preferably a central database which can be common to the plurality of GSU's, and for accessing specific service parameters corresponding to the service to be supplied to the identified aircraft, and for extracting the specific service energy budget estimate corresponding to the specific aircraft from the central database. The specific service energy budget estimate can be established by any of the methods described supra. Alternatively, the CCU is configured for establishing the specific service energy budget estimate as a function of the identified specific aircraft and specific service parameters. The CCU is further configured for sending requests of their instantaneous charge levels to the GSU's, and the GSU's send back the instantaneous energy levels of their RESU's. In a preferred embodiment, the GSU's send back their autonomy ratios (Er/Ee) as discussed supra, which is the ratio of the instantaneous energy level of the RESU to the specific service energy budget. The CCU is then configured for preselecting suitable GSU's among the plurality of GSU's, whose RESU's have an instantaneous charge level sufficient for autonomously supplying the specific service in its entirety to the specific aircraft.

In a preferred embodiment of the system according to the invention, the CCU is configured for selecting a specific GSU among the one or more suitable GSU's which have a sufficient level of energy for carrying out the specific service. The selection can be based on one or more of the following criteria:

the instantaneous charge level of the RESU of the specific GSU chosen among the suitable GSU's must be sufficient for autonomously delivering the specific service energy budget estimate with an additional safety margin; for example the safety margin can be defined as the excess of unity of the autonomy ratio. The safety margin can have a lower boundary of for example at least 20%, preferably at least 30%, for ensuring that the service can be provided even in case of unexpected events. The safety margin can also have an upper boundary or e.g., 30 or 35%, not to be exceeded, as a GSU with a higher safety margin could be better used for supplying a specific service to another aircraft requiring more energy.

a distance separating the specific GSU chosen among the suitable GSU's from the aircraft or from a servicing area of the aircraft; for example, according to this criterion, the CCU can select the GSU being the closest to the servicing area of the aircraft and thus requiring less time and energy to reach the servicing area.

optimizing the servicing of a sequence of aircrafts scheduled for servicing without recharging the RESU of the suitable GSU's, as a function of their respective energy levels relative to the specific service energy budget estimates of the sequence of servicings; for example, the specific GSU for servicing an aircraft can be the GSU having an instantaneous charge level of its RESU which best matches the specific service energy budget estimates of a sequence of two, three or more aircrafts to be serviced. This optimizes the periods of servicing and recharging of the GSU's of the fleet.

an estimate of a residual charge level of the RESU after completing the specific service and, optionally, after completing a sequence of the specific service supplied to one or more aircrafts scheduled for servicing, which does not exceed 20%, preferably 10% of a full charge level of the RESU, with or without an additional safety margin.

Preferably, the criteria for selecting the specific GSU are selected to ensure one or more of the following:

a total number of GSU's is minimized, a battery life of the RESU's is maximized, a probability of failure to supply services by the GSU's is minimized, an autonomy of the RESU of the GSU's is used to a maximum prior to reloading or recharging it after completion of a specific service in its entirety.

Preferably, the CCU is also configured for verifying in advance whether the instantaneous charge levels of the RESU of the plurality of GSU's allows for servicing a number of aircrafts scheduled for servicing within an upcoming time period.

The invention claimed is:

1. An aircraft ground support unit (GSU) for supplying a specific service according to a specific set of service parameters to an aircraft (2) on the ground and consuming a specific service energy for supplying the specific service as a whole in a given available service duration, the GSU comprising:

a rechargeable energy storage unit (3) (RESU) which, when fully charged, is configured for autonomously delivering the specific service energy required for supplying the specific service in the given available service duration, an energy sensor (4) configured for measuring an instantaneous state of energy parameters of the RESU, a control unit (5) configured for, identifying the aircraft (2), accessing a database (6) comprising:

a list of aircraft types, sets of service parameters of corresponding services to be supplied to each of the aircraft types, identifying in the database the specific set of service parameters of the specific service to the thus identified aircraft, establishing with the control unit (5) a specific service energy budget estimate defined as a total amount of energy required by the GSU for supplying the service as a whole and in the given available service duration to the aircraft corresponding to the specific set of service parameters by any one of the following:

the database comprises the specific service energy budget estimate for the specific set of service parameters, and the specific service energy budget is extracted from the database, or the database comprises a generic service energy budget estimate for the specific set of service parameters, the generic service energy budget estimate is extracted from the database, and the specific service energy budget estimate is calculated therefrom, or calculating the specific service energy budget estimate from the set of service parameters and from the thus identified aircraft, accessing the instantaneous state of the energy variables of the RESU measured with the energy sensor (4), determining with an energy indicator an instantaneous charge level of the RESU based on the instantaneous state of the energy variables, characterized in that, the control unit (5) is further configured for, comparing the specific service energy budget estimate with the instantaneous charge level of the RESU, and for generating from the control unit (5) an output signal representative of a capacity of the RESU to deliver the specific service energy budget estimate as a function of the instantaneous charge level of the RESU.

2. The aircraft ground support unit according to claim 1, is selected from the group consisting of:

a ground power unit (GPU), a ground preconditioning air unit (PCA), or cabin heater a ground pneumatic (Air Start Unit) or hydraulic power unit, an aircraft de-icing unit, a ground fuel/hydrogen supply unit, an aircraft tow/push tractor, a loading unit for loading cargo, baggage, catering, or equipment, a baggage/freight tractor, an aircraft cargo loader, a mobile aircraft passenger stair, or a mobile aircraft baggage/cargo conveyor loader, or any combination thereof.

3. The aircraft ground support unit according to claim 1, wherein the rechargeable energy storage unit (3) comprises one or more of:

a battery, a gas tank, a petrol or diesel tank, a hydrogen tank, a compressed air tank.

4. The aircraft ground support unit according to claim 1, wherein the output signal can comprise any one or combination of the following:

a binary output signal indicating whether the instantaneous charge level of the RESU is sufficient or insufficient for autonomously delivering the specific service energy budget estimate in its entirety, an output signal indicating an autonomy ratio of the instantaneous charge level of the RESU to the specific service energy budget estimate.

5. The aircraft ground support unit according to claim 1, wherein the control unit (5) is further configured for determining an actual service energy consumption after completion of the specific service, and for updating the database with the actual service energy consumption.

6. The aircraft ground support unit according to claim 1, wherein the database comprises, an internal database hosted in the control unit (5), and/or a central database remote from the GSU, and in wireless communication with the control unit (5).

7. The aircraft ground support unit according to claim 6, wherein the database comprises the central database remote from the GSU:

the control unit is configured for determining an actual service energy consumption after completion of the specific service supply, and for uploading the actual service energy consumption to the central database, and the central database is coupled to a central database processing unit configured for updating the specific service energy budget estimate based on the actual service energy consumption.

8. The aircraft ground support unit according to claim 6, wherein the control unit is configured for downloading updated service parameters from the central database to the internal database, and for updating the service parameters in the internal database.

9. The aircraft ground support unit according to claim 1, wherein the control unit (5) is configured for accessing an airport management system (7) and/or an aircraft communication unit to extract one or more aircraft data to complete the specific set of service parameters stored in the database, wherein the aircraft data comprise one or more of the following:

actual turnaround time available for supplying the specific service, actual arrival and/or departure times, external temperature and/or weather, actual duration of the turnaround, the availability or not near the aircraft of a source of power, actual number of passengers on board, actual weight of the aircraft, actual location of the aircraft including GPS coordinates thereof, actual location of a runway in service including GPS coordinates thereof, actual number of passengers remaining on board of the aircraft during the turnaround or to board the aircraft, actual number of seats in 1st class, business class, and 2nd class, actual distance to be covered by the GSU, actual quantity of baggage to be handled, actual aircraft cabin initial temperature, distance from the parking to the runway, ground air conditioning operated (on/off), aircraft air-conditioning recycling fans status (on/off), number of doors open.

10. The aircraft ground support unit according to claim 1, wherein for each aircraft type, the sets of service parameters comprise one or more of the following service parameters:

type of service to be supplied, target temperature of aircraft cabin, aircraft equipment remaining ON during a part of a turnaround, a time average consumption, energy saving guidelines imposed by the airline, estimate of power profile for delivering the service, type of turnaround comprising any one or combination of:

cargo loading, night stop, passenger flight turn-around, number of of seats in the cabin, aircraft engine type, aircraft weight.

11. The aircraft ground support unit according to claim 10, wherein the specific service energy budget estimate comprises, a value of a total service energy budget, and/or an energy profile as a function of one or more parameters selected among the service parameters.

12. The aircraft ground support unit according to claim 11, wherein the control unit is configured for, during a supply of the specific service, determining an actual instantaneous service power profile, monitoring a deviation between the estimate of power profile for delivering the service and the actual instantaneous service power profile, if the actual instantaneous service power profile exceeds the estimate of power profile for delivering the service by more than 20%, and/or if the service parameters are modified, establishing an updated specific service energy budget estimate based on the actual instantaneous service power profile and/or on the service parameters which are modified, generating an updated output signal based on the updated specific service energy budget estimate.

13. The aircraft ground support unit according to claim 1, wherein the control unit further comprises a user input interface configured for manually modifying the service parameters by a user.

14. A system for managing a fleet of a plurality of GSU's for supplying a specific service according to specific service parameters to a specific aircraft (2) on the ground comprising:

a plurality of aircraft ground support units (GSU), each comprising:

a rechargeable energy storage unit (3) (RESU) which, when fully charged, is configured for autonomously delivering a specific service energy required for supplying the specific service in a given available service duration, an energy indicator (4) configured for determining an instantaneous charge level of the RESU, a control unit (5) configured for accessing the instantaneous charge level and for communicating with a central control unit (CCU) in wireless communication with the control units (5) of the plurality of GSU's, and configured for, accessing a database (6) comprising:

a list of aircraft types, sets of service parameters of corresponding services to be supplied to each of the aircraft types, identifying in the database the specific set of service parameters of the specific service to the specific aircraft, establishing with the control unit (5) a specific service energy budget estimate defined as a total amount of energy required by the GSU for supplying the service as a whole and in the given available service duration to the aircraft corresponding to the specific set of service parameters, collecting the instantaneous charge levels of the RESU's of the plurality of GSU's with an energy indicator, comparing the specific service energy budget estimate with the instantaneous charge levels of the RESU's, and for preselecting among the plurality of GSU's, suitable GSU's whose RESU's have an instantaneous charge level sufficient for autonomously supplying the specific service in its entirety to the specific aircraft;

selecting among the suitable GSU's, a specific GSU for supplying the specific service to the specific aircraft; and supplying the specific service to the aircraft (2) based on an output signal from the control unit (5) representative of a capacity of the RESU to deliver the specific service energy budget estimate as a function of the instantaneous charge level of the RESU.

15. The system according to claim 14, wherein the CCU is configured for selecting the specific GSU based on one or more of the following criteria:

the instantaneous charge level of the RESU of the suitable GSU's must be sufficient for autonomously delivering the specific service energy budget estimate with an additional safety margin, a distance separating the suitable GSU's from the aircraft or from a servicing area of the aircraft, a capacity of servicing in a row a sequence of one or more aircrafts scheduled for servicing without recharging the RESU of the suitable GSU's, as a function of their respective specific service energy budget estimates, an estimate of a residual charge level of the RESU after completing the specific service.

16. The system according to claim 15, wherein the estimate of the residual charge level is followed by completing corresponding specific services to a sequence of one or more aircrafts scheduled for servicing, which does not exceed 20% of a full charge level, with or without an additional safety margin.

17. The system according to claim 16, wherein the residual charge level does not exceed 10% of the full charge level, with or without an additional safety margin.

* * * * *